(12) United States Patent
Woodward

(10) Patent No.: US 9,529,938 B2
(45) Date of Patent: Dec. 27, 2016

(54) UNIFIED FILE SEARCH

(71) Applicant: Google Inc., Mountain View, CA (US)

(72) Inventor: Joshua Woodward, Mountain View, CA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 13/662,008

(22) Filed: Oct. 26, 2012

(65) Prior Publication Data

US 2014/0122423 A1 May 1, 2014

(51) Int. Cl.
*G06F 7/00* (2006.01)
*G06F 17/30* (2006.01)

(52) U.S. Cl.
CPC ....... *G06F 17/30997* (2013.01); *G06F 17/301* (2013.01); *G06F 17/30389* (2013.01)

(58) Field of Classification Search
CPC ................................................ G06F 17/30442
USPC .......................................................... 707/713
See application file for complete search history.

(56) References Cited

U.S. PATENT DOCUMENTS

| | | | |
|---|---|---|---|
| 7,346,613 B2 | 3/2008 | Hurst-Hiller et al. | |
| 7,930,301 B2 | 4/2011 | Marcjan et al. | |
| 8,341,147 B2 | 12/2012 | Hu et al. | |
| 2007/0033176 A1* | 2/2007 | Enns | 707/3 |
| 2008/0109422 A1* | 5/2008 | Dedhia | G06F 17/30867 |
| 2008/0281802 A1* | 11/2008 | Peterson et al. | 707/4 |
| 2012/0047168 A1 | 2/2012 | Yokoi et al. | |
| 2012/0233209 A1 | 9/2012 | Cheng et al. | |
| 2012/0233211 A1 | 9/2012 | Hassan et al. | |

FOREIGN PATENT DOCUMENTS

| | | |
|---|---|---|
| KR | 20090066702 A | 6/2009 |
| KR | 20100051575 A | 5/2010 |
| KR | 20110129141 A | 12/2011 |
| WO | 2007094536 A1 | 8/2007 |
| WO | WO 2012160567 A1 * | 11/2012 |

OTHER PUBLICATIONS

International Search Report and Written Opinion for International Application No. PCT/US2013/066799, mailed Feb. 28, 2014, 11 pages.

(Continued)

*Primary Examiner* — Ajith Jacob
(74) *Attorney, Agent, or Firm* — Brake Hughes Bellermann LLP

(57) ABSTRACT

The unified file search may be performed by a user device. The user device includes a processor and a memory. The memory includes code segments that when executed by the processor cause the processor to generate a search parameter; generate a first search metadata based on data stored in the memory and the search parameter, the first search metadata representing the data stored in the memory; generate a search request based on the search parameter; transmit the search request to at least one associated remote data storage resource; receive a second search metadata from the at least one associated remote data storage resource, the second search metadata representing data stored in the at least one associated remote data storage resource; and generate a unified search metadata including the first search metadata and the second search metadata.

18 Claims, 9 Drawing Sheets

(56) References Cited

OTHER PUBLICATIONS

"Searching Time Machine backup data", retrieved on Apr. 28, 2016 from http://web.archive.org/web/20090831050901/http://superuser.com/questions/7518/searching-time-machine-backup-data, Aug. 31, 2009, pp. 1-3.
Extended European Search Report for EP Application No. 13848208.8, mailed May 13, 2016, 10 pages.
Faas, "Apple Remote Desktop 3, Part 3 Gathering Information about Remote Computers", retrieved on Apr. 28, 2016 from http://www.peachpit.com/articles/printerfriendly/606977, Sep. 15, 2006, pp. 1-9.

* cited by examiner

UNIFIED FILE SEARCH

BACKGROUND

Embodiments relate to performing file searches on a plurality of computing systems.

SUMMARY

One embodiment includes a user device. The user device includes a processor and a memory. The memory includes code segments that when executed by the processor cause the processor to generate a search parameter; generate a first search metadata based on data stored in the memory and the search parameter, the first search metadata representing the data stored in the memory; generate a search request based on the search parameter; transmit the search request to at least one associated remote data storage resource; receive a second search metadata from the at least one associated remote data storage resource, the second search metadata representing data stored in the at least one associated remote data storage resource; and generate a unified search metadata including the first search metadata and the second search metadata.

Another embodiment includes a server. The server includes a processor configured to receive user device metadata and a search parameter from a user device, the user device metadata representing data stored at the user device. The server includes a memory including code segments that when executed by the processor cause the processor to: generate first search metadata based on the received user device metadata and the search parameter; generate second search metadata based on data stored in the memory and the search parameters, the second metadata representing data stored in the memory; generate a search request based on the search parameter; transmit the search request to a remote data storage resource associated with the user device; receive third search metadata, in response to the search request, from the remote data storage resource, the third search metadata representing data stored at the remote data storage resource; generate unified search metadata including the first search metadata, the second search metadata, and the third search metadata; and transmit the unified search metadata to the user device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
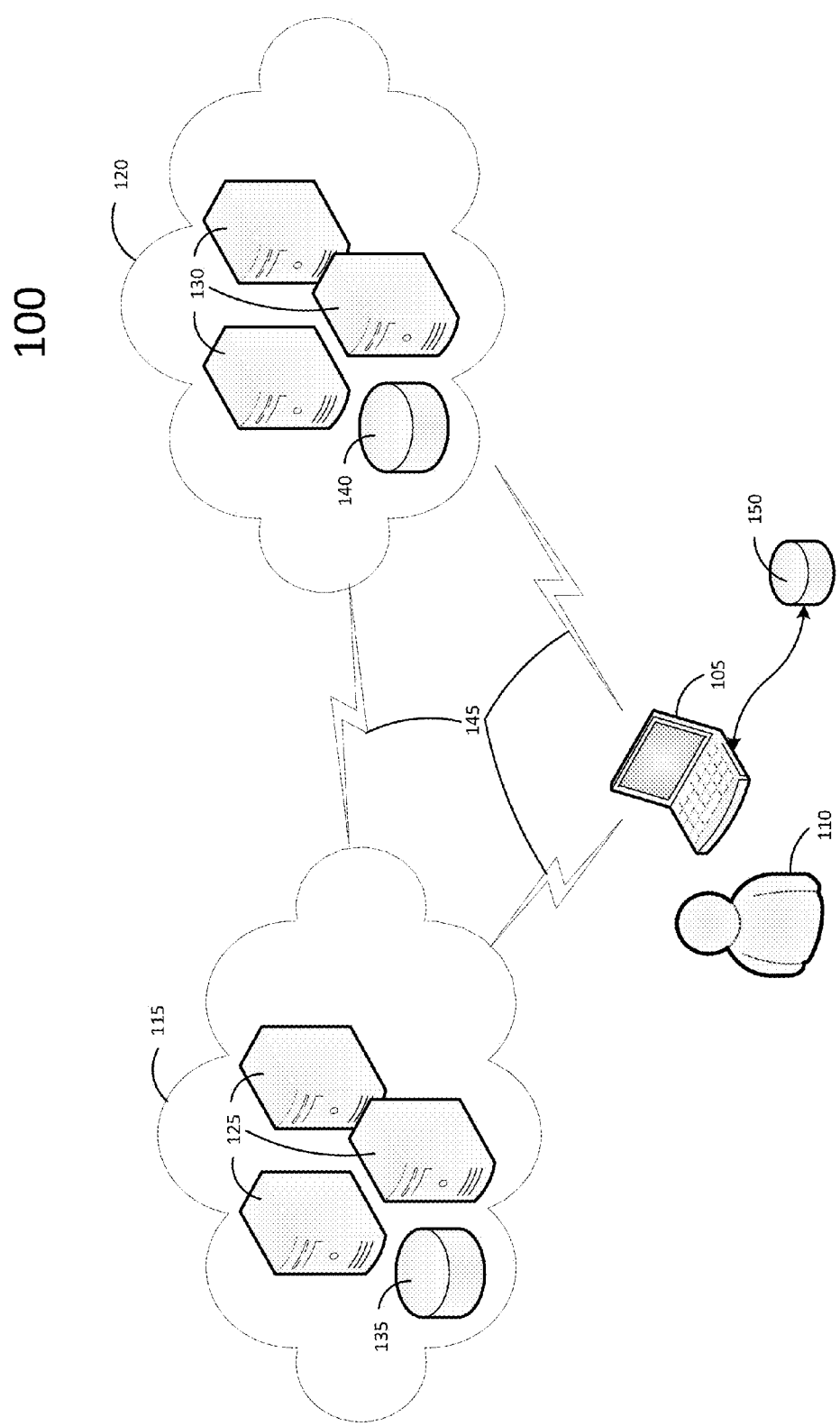
FIG. 1 illustrates a block diagram of a network system in accordance with an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 illustrates a block diagram of a network system in accordance with an example embodiment. As shown in FIG. 1, the network system 100 includes a user device 105, a first server storage system 115, and a second server storage system 120. The first server storage system 115 includes servers 125 and storage system 135. The second server storage system 120 includes servers 130 and storage system 140. The user device 105 may include at least one associated peripheral device 150. FIG. 1 further illustrates a user 110 of the user device 105 and communicative links 145 (e.g., wired or wireless communication links) that communicatively couple each of the user device 105, the first server storage system 115, and the second server storage system 120 to each other.

According to example embodiments, the first server storage system 115, and the second server storage system 120 may be third party cloud storage systems configured to store data and information related to the data. The information related to the data may be referred to metadata. The third party cloud storage systems may have different protocols for accessing, storing and/or sharing data. The third party cloud storage systems are typically independent (e.g., not interconnected) of each other and do not (on their own) share data between them. However, according to example embodiments, data and metadata on separate third party cloud storage systems may be searched and the results of the search may be combined as a unified search as described in more detail below. For example, the third party cloud storage systems may include a GOOGLE™, a Google Drive, a DROPBOX™ or some other remote (e.g., cloud network) data storage resource.

For the purposes of the description below, the first server storage system 115 and the second server storage system 120 are distinct third party cloud storage systems having different protocols. However, the first server storage system 115 and the second server storage system 120 are not limited thereto. Each of the first server storage system 115 and the second server storage system 120 may have an associated protocol for accessing, storing and/or sharing data stored therein. The data being stored in, for example, storage system 135 and storage system 140. Storage system 135 and storage system 140 being, for example, a magnetic storage device, an optical storage device, and/or solid state storage device. The peripheral device 150 may be configured to store data and/or information; the information may be associated with the data. The peripheral device may be a memory device (e.g., a magnetic storage device, an optical storage device, solid state storage device, and the like). The peripheral device may be a device including a memory (e.g., a digital camera, a cell phone, a PDA, and the like.

Figure 2:
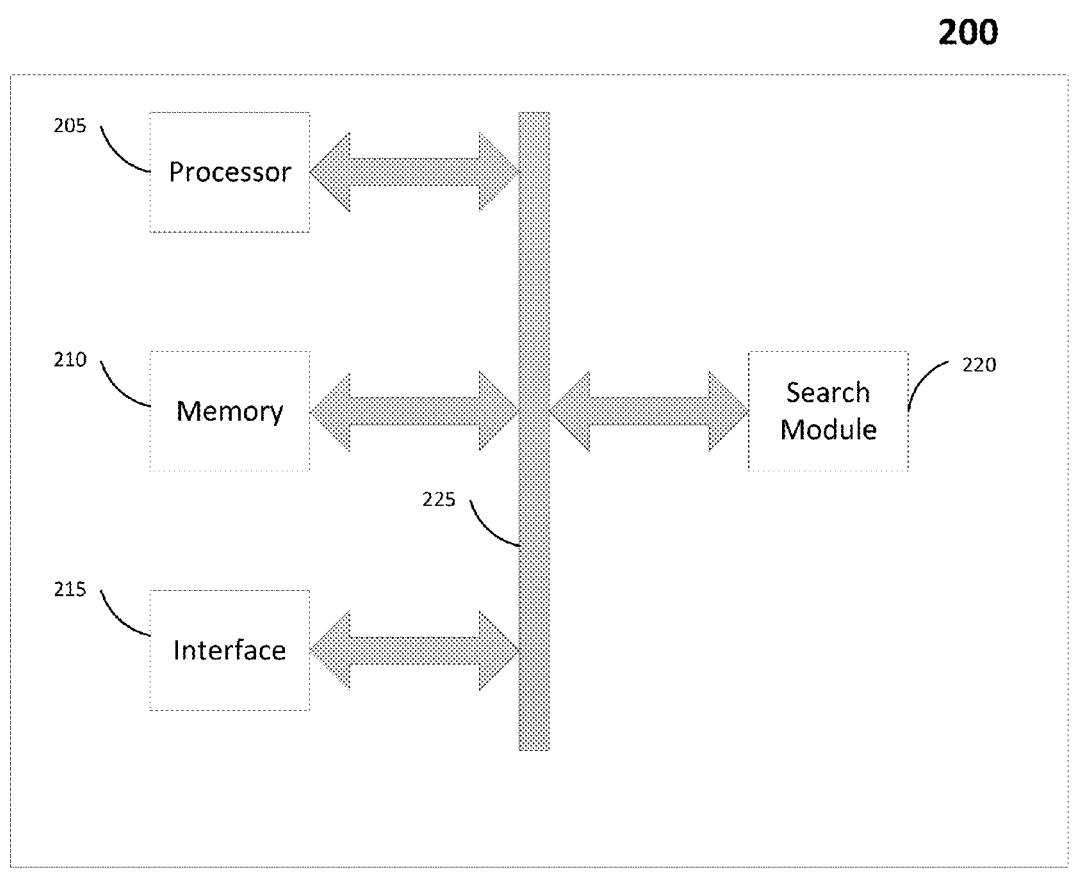
FIG. 2 illustrates a block diagram of a computing device in accordance with an example embodiment.

FIG. 2 illustrates a computing device in accordance with an example embodiment. The computing device 200 may be a server, a personal computer, a laptop, a smartphone and the like. The computing device 200 may be a part of a server, a personal computer, a laptop, a smartphone and the like. For example, the computing device 200 may be (or, alternatively, may be a part of) at least one of user device 105, servers 125, and servers 130.

As shown in FIG. 2, the computing device 200 may include a processor 205, a memory 210, an interface 215 and a search module 220. The processor 205, the memory 210, the interface 215 and the search module 220 are communicatively coupled via bus 225. The processor 205 may execute instructions within the computing device 200, including instructions stored in the memory 205. The processor may be implemented as a chipset of chips that include separate and multiple analog and digital processors. The processor may provide, for example, for coordination of the other components of the device 200, such as control of interface 215, applications run by device 200, and communication by device 200.

The memory 210 may be configured to store information within the computing device 200. The memory 210 may be implemented as one or more of a computer-readable medium or media, a volatile memory unit or units, or a non-volatile memory unit or units. The interface 215 may be configured to communicate with other devices. For example, interface 215 associated with a user device 105 may communicate with peripheral device 150, storage system 135 and/or storage system 140.

The search module 220 may be software module including code segments that when executed by processor 205 cause processor 205 to perform certain tasks for performing a unified search while interacting with memory 210 and interface 215. Alternatively, or in addition, the search module may be an application specific integrated chip (ASIC) configured to perform certain tasks for performing a unified search. The ASIC may include a processor(s), a memory(s) and other components as necessary to perform tasks.

The search module 220 may be configured to generate a search parameter; generate a first search metadata based on data stored in the memory and the search parameter, the first search metadata representing the data stored in the memory; generate a search request based on the search parameter; transmit the search request to at least one associated remote data storage resource; receive a second search metadata from the at least one associated remote data storage resource, the second search metadata representing data stored in the at least one associated remote data storage resource; and generate a unified search metadata including the first search metadata and the second search metadata.

The search module 220 may be configured to generate first search metadata based on the received user device metadata and the search parameter; generate second search metadata based on data stored in the memory and the search parameters, the second metadata representing data stored in the memory; generate a search request based on the search parameter; transmit the search request to a remote data storage resource associated with the user device; receive third search metadata, in response to the search request, from the remote data storage resource, the third search metadata representing data stored at the remote data storage resource; generate unified search metadata including the first search metadata, the second search metadata, and the third search metadata; and transmit the unified search metadata to the user device.

Further details regarding search module 220 may be discussed below in more detail as discussing the methods associated with FIGS. 4-6.

Figure 3A:
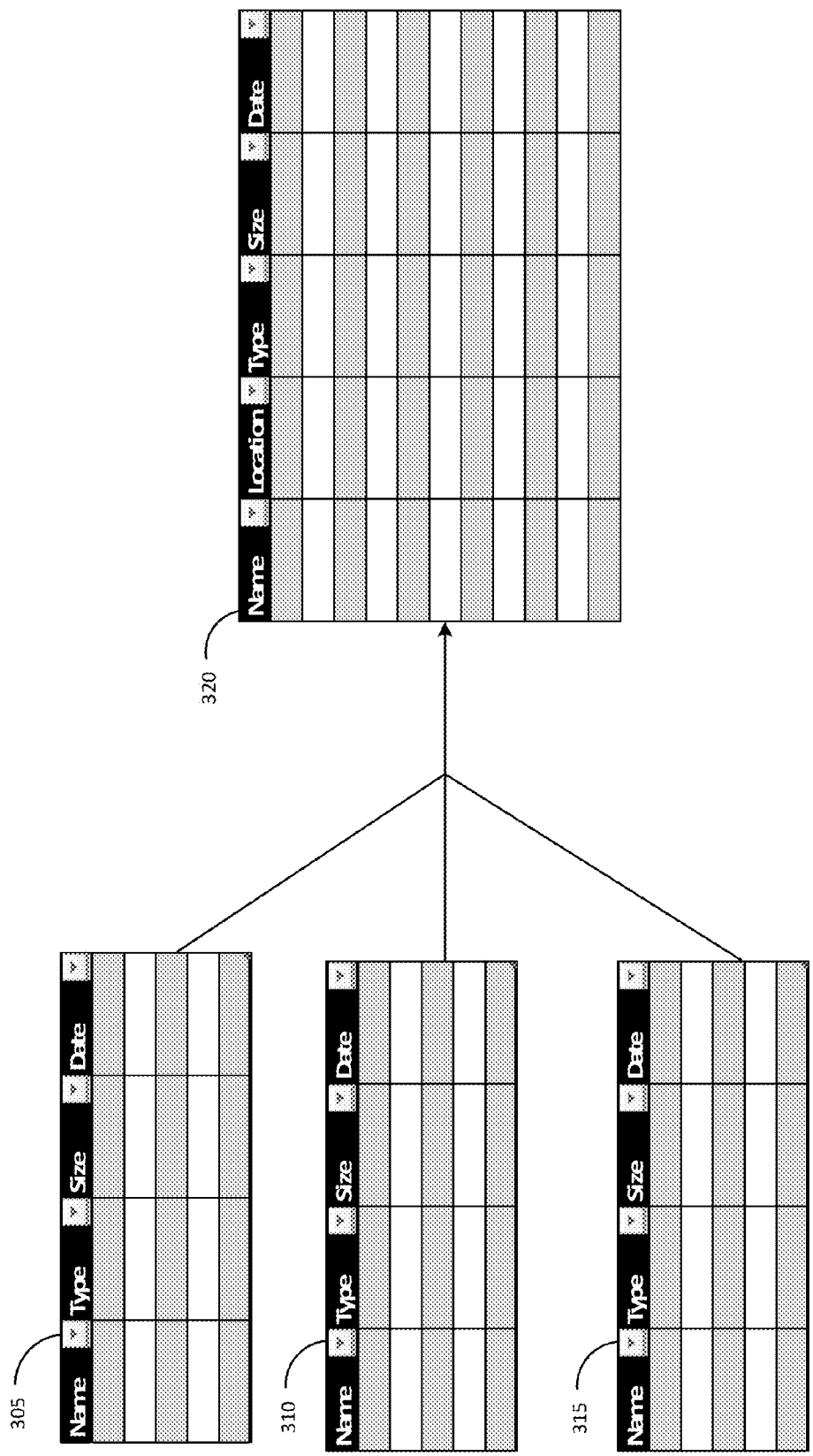
FIG. 3A illustrates a unified file search in accordance with an example embodiment.

FIG. 3A illustrates a unified file search in accordance with an example embodiment. As shown in FIG. 3A, search metadata 305, 310 and 315 are combined (e.g., unified) to generate unified search metadata 320. For example, search metadata 305 may represent data stored on user device 105. Search metadata 310 may represent data stored in storage system 135. The search metadata may represent various characteristics of stored data including, but not limited to, filetype, file name, file size, date created, date modified, and the like. Search metadata 315 may represent data stored in storage system 140. Although three search metadata elements are shown, example embodiments are not limited to three. Each of search metadata 305, 310 and 315 may be based on some search criteria generated on user device 305 based on input(s) from user 110. Each of search metadata 305, 310 and 315 may be combined by, for example, user device 105 in order to generate unified search metadata 320. Accordingly, the unified search metadata 320 may represent data stored at various interconnected/networked devices including, but not limited to user device 105, peripheral 150, first server storage system 115, and the second server storage system 120.

The search metadata 305, 310 and 315 may include fields such as name, type, size and date (e.g., last modified). The unified search metadata 320 may include fields such as name, location (e.g., data stored on user device 105 labeled as, for example "local"), type, size and date. The aforementioned fields are only examples and are not intended to limit the scope of example embodiments in any way. The unified search metadata 320 fields may be ordered (e.g., sorted) based on the metadata shown in the fields. For example, the unified search metadata 320 may be sorted alphabetically by name or sorted by location. In addition, the unified search metadata 320 may be sorted based on any combination of fields.

Search metadata 305, 310 and 315 may be stored locally in a memory queue (e.g., a memory queue on user device 105 or server 130). For example, search metadata 305, 310 and 315 may be updated on a regular basis by refreshing the memory queue. In other words, search metadata 305, 310 and 315 may be replaced by new metadata if, for example, the data that the search metadata 305, 310 and 315 represents changes. Alternatively, metadata representing data stored in storage systems 135, 140 and data on user device 105 may be stored in the memory queue. The metadata representing data stored in storage systems 135, 140 and data on user device 105 may then be searched in order to generate search metadata 305, 310 and 315. Alternatively, data on user device 105 may be searched separately in order to generate, for example, search metadata 305 representing the data on user device 105. Alternatively, data stored in storage systems 135, 140 may be searched separately, based on search criteria received from user device 105 in order to generate, for example, search metadata 310 and 315 representing the data stored in storage systems 135, 140.

Figure 3B:
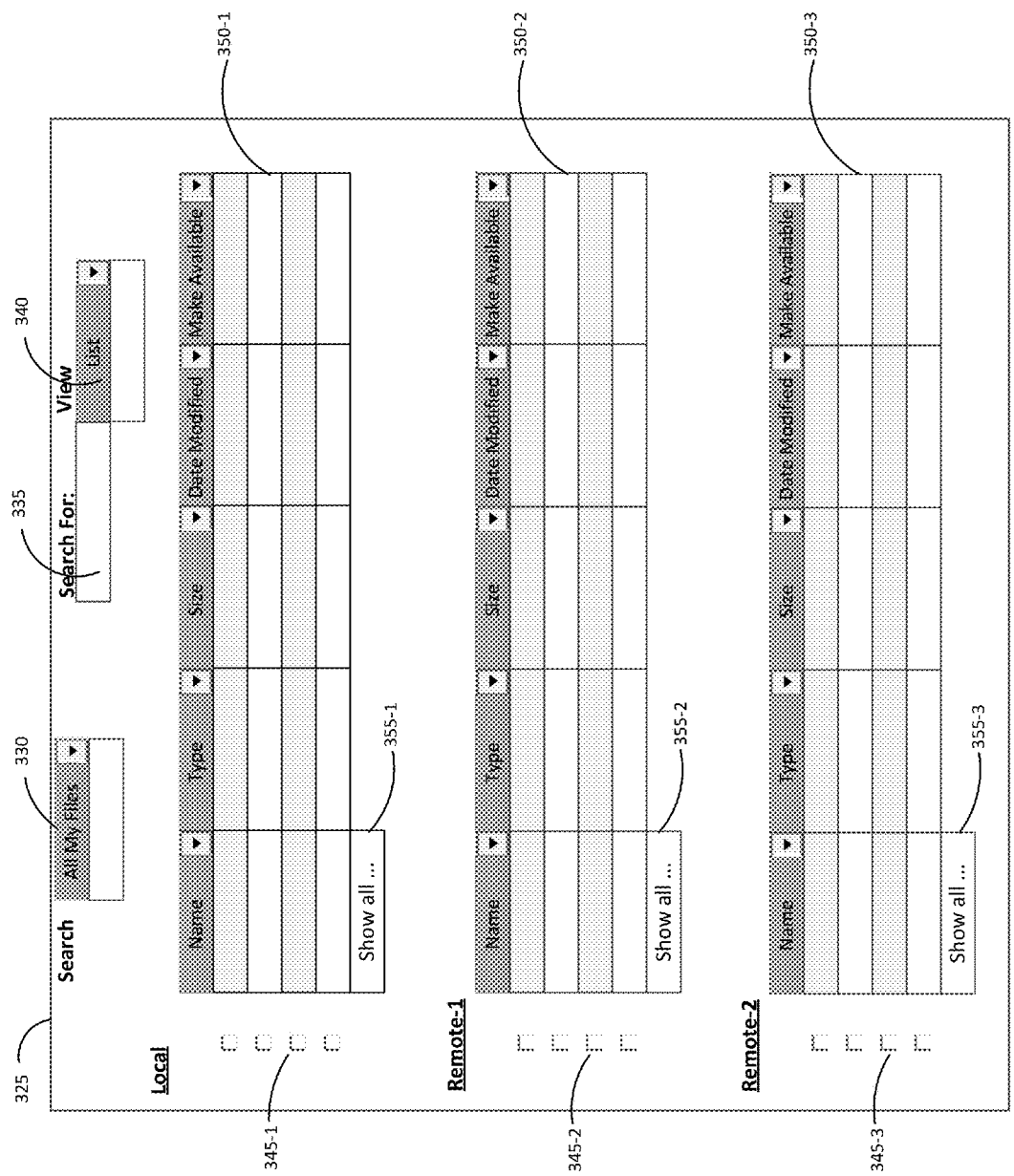
FIGS. 3B and 3C illustrate unified file search displays in accordance with at least one example embodiment.

FIG. 3B illustrates unified file search display in accordance with an example embodiment. As shown in FIG. 3B, a unified file search display 325 may include several features directed toward searching and displaying unified search metadata (e.g., unified search metadata 320). The below described examples are for illustrative purposes and are not intended to limit the scope of the example embodiments in any way.

For example, the unified file search display 325 may include a drop down list 330 configured to list and select data storage locations (e.g., storage systems 135, 140 and data stored on user device 105). For example, the unified file search display 325 may include a text box 335 configured to enter search parameters for searching, for example, the selected data storage locations. The unified file search display 325 may also include a drop down list 340 configured to list and select a view style for displaying the results of the search (e.g., unified search metadata 320).

For example, the unified file search display 325 may include a display grid 350 configured to display the results of the search in a form based on the selected view style. As is shown in FIG. 3B the display grid 350 may be displayed in more than one sectional display grid. For example, each selected data storage location (e.g., local, Remote-1 and Remote-2) may have an associated sectional display grid 350-1, 350-2 and 350-3. Each sectional display grid 350-1, 350-2, 350-3 may include a selector 355-1, 355-2, 355-3 configured to select a number of search results (e.g., Show all, Top 5, etc.). The unified file search display 325 may also include selector boxes 345-1, 345-2, 345-3 configured to select a search result from the sectional display grid 350-1, 350-2, 350-3. A number selector boxes 345-1, 345-2, 345-3 may be selected to, for example, compare search results. Alternatively, a single selector box 345-1, 345-2, 345-3 may be selected to, for example, select the metadata file for expanded display. Local, Remote-1 and Remote-2 may represent user device 105, and storage systems 135, 140 respectively.

Figure 3C:
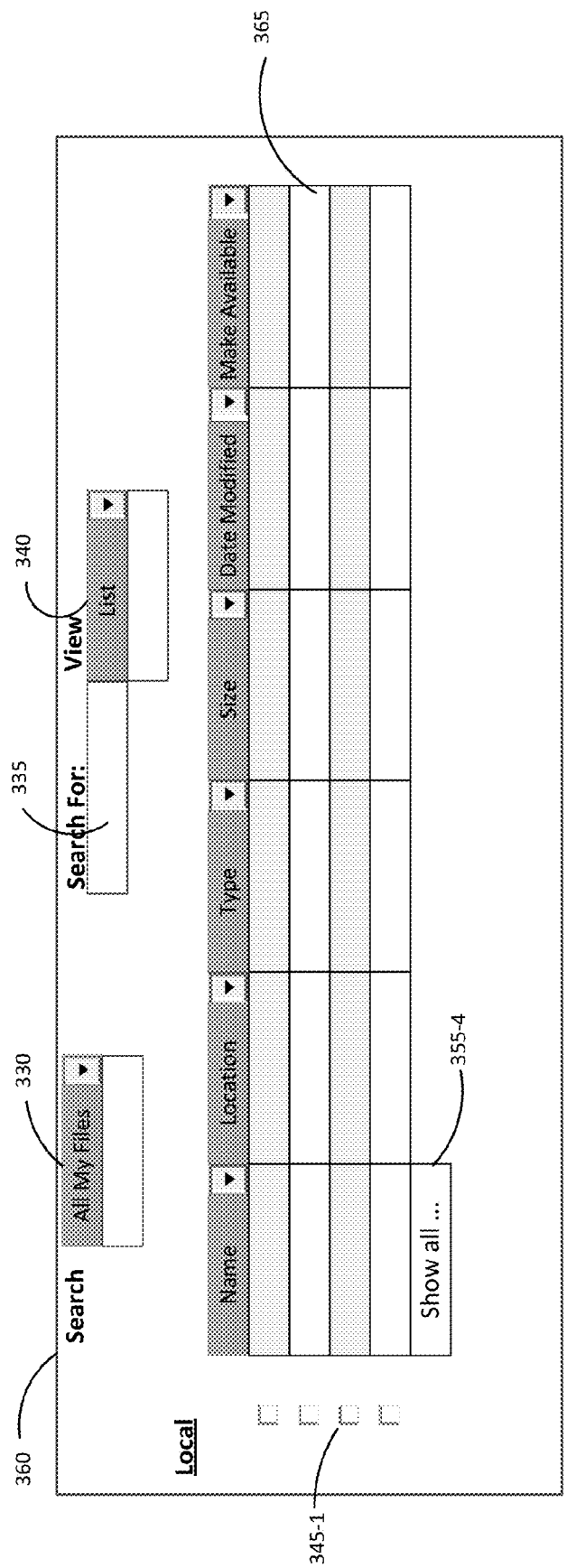

FIG. 3C illustrates unified file search display in accordance with an example embodiment. As shown in FIG. 3C, a unified file search display 360 may include several features directed toward searching and displaying unified search metadata (e.g., unified search metadata 320).

The unified file search display 360 may include several features from the unified file search display 325 which are numbered the same and will not be described further. In addition, the unified file search display 360 may include a drop down list 365 configured to list metadata including data storage locations (e.g., storage systems 135, 140 and data stored on user device 105).

Figure 4:
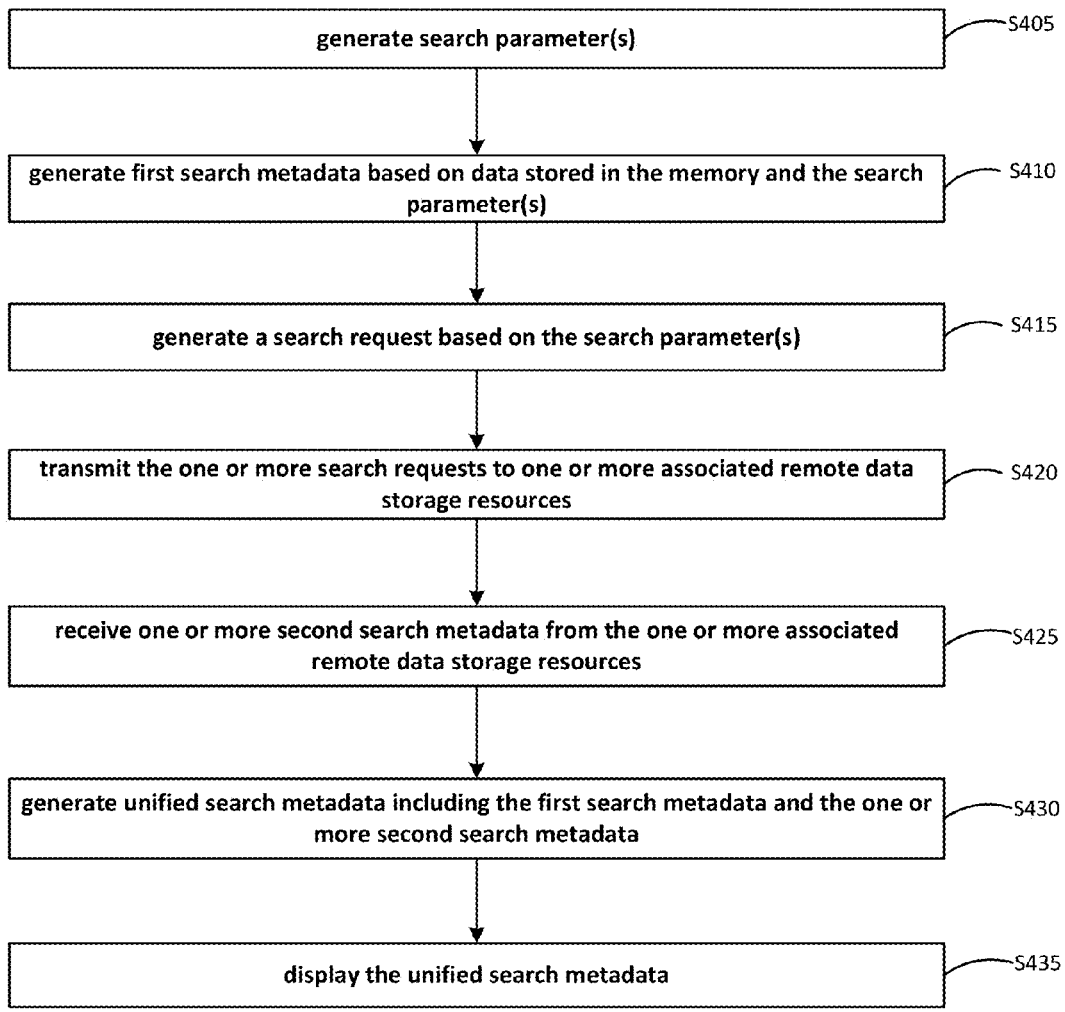
FIG. 4 illustrates a method for generating a unified file search in accordance with an example embodiment.

FIG. 4 illustrates a method for generating a unified file search in accordance with an example embodiment. The steps of FIG. 4 may be performed by user device 105 as (or including) computing device 200 utilizing, for example, search module 220. In step S405, the user device 105 generates search parameter(s). The Search parameters may be variable parameters entered as text by a user to generate a search string. For example, user 110 may enter a search string (e.g., "active" & "volcano") into text box 335 on the unified file search display 325. The user 110 may then use drop down list 330 to select "All My Files" on the unified file search display 325. As a result user device 105 may generate search parameter(s) that result in a search for "active", "volcano" and "active volcano" on every associated drive (local and remote) of the user device 105.

Associated drives may include memory associated with the user device (e.g., local memory devices), which may include hard drives, random access memories (RAM), processor memories, cache memories, peripheral memory and the like. Associated drives may include remote storage systems (e.g., storage systems 135, 140) for which the user 110 has access to user credentials (e.g., user name and password) associated with the remote systems including the remote storage systems.

In step S410, the user device 105 generates first (e.g., local) search metadata based on data stored in a memory and the search parameter(s). For example, the user device 105 may search at least one of the associated local memory devices (e.g., hard drive or RAM) for content associated with the search parameter(s). Continuing the above example, the user device 105 may search the associated local memory for "active", "volcano" and "active volcano". The user device 105 may search, for example, the content of files stored on the associated local memory and/or names of files stored on the associated local memory. The results of the search may be stored as, for example, search metadata 305.

In step S415, the user device 105 generates a search request based on the search parameter(s). For example, the user device 105 may determine the remote storage systems (e.g., storage systems 135, 140) to be searched. Determining which remote storage systems to be searched may be based on the selection made by user 110 using drop down list 330. For each of the remote storage systems to be searched, the user device 105 may determine a protocol and protocol definition associated with the remote storage system to perform a search of the data on the remote storage system. The user device 105 may generate a search request based on the search parameter(s) using each of the determined protocols and protocol definitions. Accordingly, different search requests may be created for each separate storage system based on the protocol specific to that storage system In step S420, the user device 105 transmits the search request to at least one associated remote data storage resource. For example, the user device 105 may transmit the generated search request to each of the server storage system 115, 120 using a protocol associated with communication over communicative link 145.

In step S425, the user device 105 receives second (e.g., remote) search metadata from the at least one associated remote data storage resource. The second search metadata from the at least one associated remote data storage resource is received in response to the transmitted search request. Continuing the above example, the user device 105 may receive from the at least one associated remote data storage resource results from a search of the associated remote storage system (e.g., storage systems 135, 140) for "active", "volcano" and "active volcano". The search may include, for example, the content of files stored on the associated remote storage system and/or names of files stored on the associated remote storage system. The results of the search may be stored as, for example, search metadata 310, 315.

In step S430, the user device 105 generates unified search metadata (e.g., unified search metadata 320) including the first search metadata and the second search metadata. For example, the first (e.g., local) search metadata may represent data stored on the user device 105. The second (e.g., remote) search metadata may represent data stored on (at least one of) the storage systems 135, 140. The user device 105 may generate unified search metadata by combining the search metadata representing data stored on the user device 105 with search metadata representing data stored on the storage systems 135, 140 as shown as unified search metadata 320 illustrated in FIG. 3A.

In step S435, the user device 105 displays the unified search metadata. For example, the user device 105 may display the unified search metadata on a display screen associated with user device 105 using the unified file search display 325 illustrated in FIG. 3B.

Figure 5:
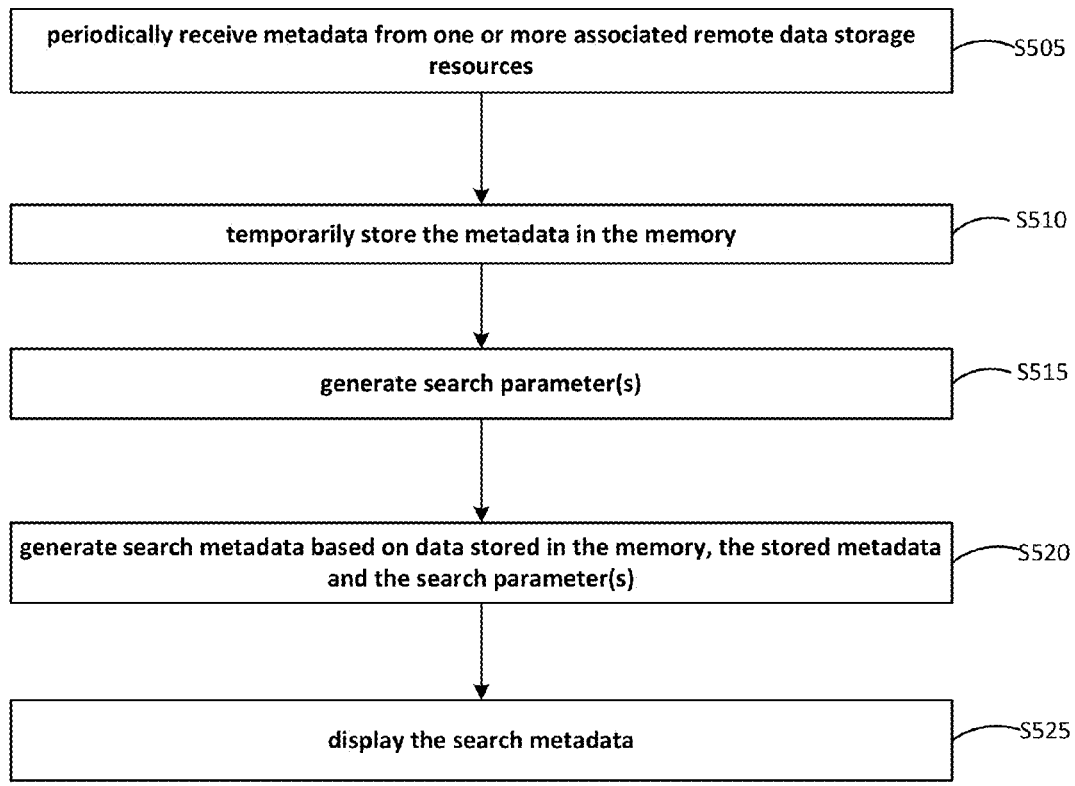
FIG. 5 illustrates another method for generating a unified file search in accordance with an example embodiment.

FIG. 5 illustrates another method for generating a unified file search in accordance with an example embodiment. The steps of FIG. 5 may be performed by user device 105 as (or including) computing device 200 utilizing, for example, search module 220. In step S505, the user device 105 receives remote metadata from at least one associated remote data storage resource. The remote metadata may represent data stored in the at least one associated remote data storage resource. For example, the user device 105 may receive remote metadata from each of the server storage systems 115, 120 using a protocol associated with communication over communicative link 145. The remote metadata may represent data stored in the storage systems 135, 140. The remote metadata may have a protocol and/or protocol definition associated with the remote storage system 115, 120, from which the remote metadata is received, in order to determine a format associated with the remote metadata.

In step S510, the user device 105 stores the remote metadata in the memory. For example, the remote metadata may be stored in a memory queue associated with the user device 105. The memory queue may be an element of hard drives, random access memories (RAM), processor memories, cache memories and/or peripheral memory associated with the user device. For example, an application (or protocol) associated with the remote storage system 115, 120 and configured to provide functionality to store and access data on the remote storage system 115, 120 may have an associated queue generated at runtime of the application. Metadata from the remote storage system 115, 120 may be stored in the associated queue.

In step S515, the user device 105 generates search parameter(s). For example, user 110 may enter a search string (e.g., "active" & "volcano") into text box 335 on the unified file search display 325. The user 110 may then use drop down list 330 to select "All My Files" on the unified file search display 325. As a result user device 105 may generate search parameter(s) that result in a search for "active", "volcano" and "active volcano" on every associated drive (local and remote) of the user device 105.

In step S520, the user device 105 generates unified search metadata (e.g., unified search metadata 320) based on the search parameter(s), data stored in the memory and the stored remote metadata. For example, the user device 105 may search at least one of the associated local memory devices (e.g., hard drive or RAM) for content associated with the search parameter(s). Continuing the above example, the user device 105 may search the associated local memory for "active", "volcano" and "active volcano". The user device 105 may search, for example, the content of files stored on the associated local memory and/or names of files stored on the associated local memory. The results of the search may be stored as, for example, search metadata 305.

Further, the user device 105 may search metadata from the remote storage system 115, 120 that is stored in the associated queue (e.g., application queue) for content associated with the search parameter(s). Continuing the above example, the user device 105 may search the associated queue for "active", "volcano" and "active volcano". The user device 105 may search, for example, the content of files stored in the associated queue and/or names of files stored in the associated queue. The results of the search may be stored as, for example, search metadata 310, 315. The user device 105 may generate unified search metadata by combining the search metadata representing data stored on the user device 105 (e.g., search metadata 305) with search metadata representing data stored on the storage systems 135, 140 (e.g., search metadata 310, 315) as shown as unified search metadata 320 illustrated in FIG. 3A.

In step S525, the user device 105 displays the unified search metadata. For example, the user device 105 may display the unified search metadata on a display screen associated with user device 105 using the unified file search display 325 illustrated in FIG. 3B.

Figure 6:
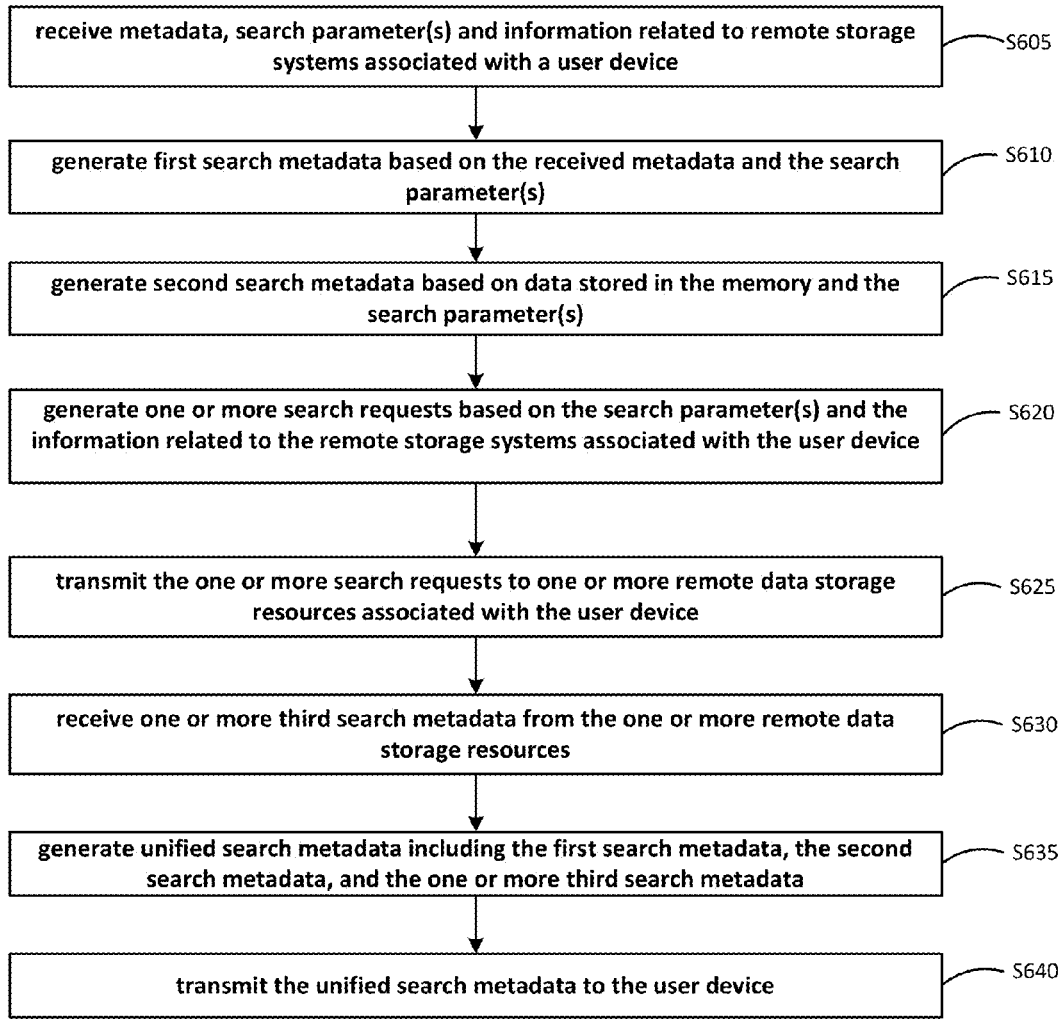
FIG. 6 illustrates yet another method for generating a unified file search in accordance with an example embodiment.

FIG. 6 illustrates yet another method for generating a unified file search in accordance with an example embodiment. The steps of FIG. 6 may be performed by server 125 and/or server 135 as (or including) computing device 200 utilizing, for example, search module 220. In step S605, the server 125, 135 receives user device metadata, search parameter(s), and information related to remote storage systems associated with a user device from a user device 105. The user device metadata represents data stored at the user device 105. For example, user 110 may enter a search string (e.g., "active" & "volcano") into text box 335 on the unified file search display 325. The user 110 may then use drop down list 330 to select "All My Files" on the unified file search display 325. As a result user device 105 may generate search parameter(s) that result in a search for "active", "volcano" and "active volcano". The generated search parameter(s) may be transmitted by the user device 105 and received by the server 125, 135.

The user device 105 may also transmit, and the server 125 receives, metadata representing data stored on associated drives of the user device 105. Associated drives may include memory associated with the user device (e.g., local memory devices), which may include hard drives, random access memories (RAM), processor memories, cache memories, peripheral memory and the like. The user device 105 may also transmit, and the server 125 receives, information related to remote storage systems associated with the user device 105. The information related to remote storage systems associated with the user device 105 may include a list of remote storage systems (e.g., server storage systems 115, 120) and user credentials (e.g., user name and password) associated with each of the remote systems.

The generated search parameter(s), the metadata representing data stored on associated drive of the user device 105, and the information related to remote storage systems associated with the user device 105 may be transmitted by the user device 105 and received by the server 125, 135 together (e.g., a single transmission packet) and/or alternatively separately (e.g., multiple transmission packets). The user device 105 may transmit and the server 125, 135 may receive remote the generated search parameter(s), the metadata representing data stored on associated drive of the user device 105, and the information related to remote storage systems associated with the user device 105 using a protocol associated with communication over communicative link 145.

In step S610, the server 125, 135 generates first search metadata based on the received user device metadata and the search parameter(s). For example, if server 125 receives the user device metadata and the search parameter(s) from the user device 105, server 125 may search the user device metadata using the search parameter(s). The result of the search may be the first search metadata. The results of the search may be stored by the server 125 as, for example, search metadata 305.

In step S615, the server 125, 135 generates second search metadata based on data stored in the memory and the search parameter(s). The second search metadata representing data stored in the memory. For example, if server 125 receives the user device metadata and the search parameter(s) from the user device 105, server 125 may search storage system 140 using the search parameter(s). The result of the search may be the second search metadata. The results of the search may be stored by the server 125 as, for example, search metadata 310.

In step S620, the server 125, 135 generates a search request based on the search parameter(s) and the information related to remote storage systems associated with the user device 105. For example, the server 125 may determine the remote storage systems (e.g., server storage system 120) to be searched based on the information related to remote storage systems associated with the user device 105. Determining which remote storage systems to be searched may be based on the selection made by user 110 using drop down list 330. For each of the remote storage systems to be searched, the server 125 may determine a protocol and protocol definition associated with the remote storage system to perform a search of the data on the remote storage system. The server 125 may generate a search request based on the search parameter(s) using each of the determined protocols and protocol definitions.

In step S625, the server 125, 135 transmits the search request to a remote data storage resource associated with the user device 105. For example, the server 125 may transmit the generated search request to server storage system 120 using a protocol associated with communication over communicative link 145.

In step S630, the server 125, 135 receives third search metadata, in response to the search request, from the remote data storage resource, the third search metadata representing data stored at the remote data storage resource. The third search metadata from the remote data storage resource is received in response to the transmitted search request. Continuing the above example, the server 125 may receive from the remote data storage resource results from a search of the associated remote storage system (e.g., storage system 140) for "active", "volcano" and "active volcano". The search may include, for example, the content of files stored on the remote storage system and/or names of files stored on the remote storage system. The results of the search may be stored by the server 125 as, for example, search metadata 315.

In step S635, the server 125, 135 generates unified search metadata (e.g., unified search metadata 320) including the first search metadata, the second search metadata, and the third search metadata. For example, the first (e.g., local) search metadata may represent data stored on the user device 105 (e.g., search metadata 305). The second (e.g., remote) search metadata may represent data stored on the storage system 135 (e.g., search metadata 310). The third (e.g., remote) search metadata may represent data stored on the storage system 140 (e.g., search metadata 315). The server 125 may generate unified search metadata by combining the search metadata representing data stored on the user device 105 with search metadata representing data stored on the storage systems 135, 140 as shown as unified search metadata 320 illustrated in FIG. 3A.

In step S640, the server 125, 135 transmits the unified search metadata to the user device 105. For example, the server 125 may transmit the generated unified search metadata to user device 105 using a protocol associated with communication over communicative link 145.

The user device 105 may display the unified search metadata. For example, the user device 105 may display the unified search metadata on a display screen associated with user device 105 using the unified file search display 325 illustrated in FIG. 3B.

Figure 7:
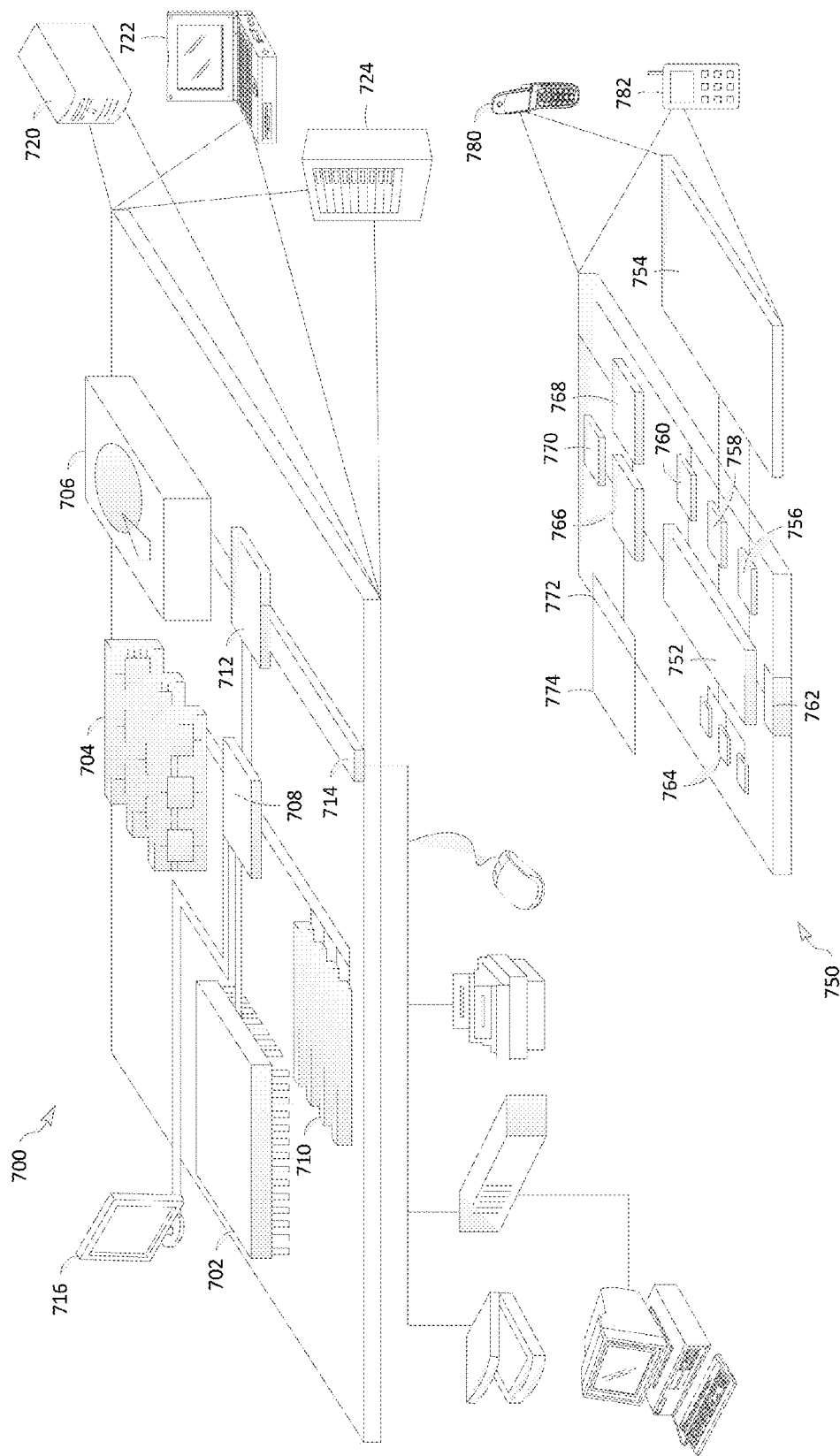
FIG. 7 illustrates a block diagram of a system in accordance with an example embodiment.

FIG. 7 illustrates a block diagram of a system in accordance with an example embodiment. FIG. 7 shows an example of a generic computer device 700 and a generic mobile computer device 750, which may be used with the techniques described herein. Computing device 700 may represent various forms of digital computers, such as laptops, desktops, workstations, personal digital assistants, servers, blade servers, mainframes, and other appropriate computers. Computing device 750 may represent various forms of mobile devices, such as personal digital assistants, cellular telephones, smart phones, and other similar computing devices. The components shown here, their connections and relationships, and their functions, are meant to be exemplary only, and are not meant to limit implementations of example embodiments described and/or claimed in this document. For example, computing device 700 may represent at least one of user device 105 and servers 125, 130. Computing device 750 may include computing device 200.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a graphical user interface (GUI) on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system, etc.).

The memory 704 stores information within the computing device 700. In one implementation, the memory 704 includes a volatile memory unit or units. In another implementation, the memory 704 includes a non-volatile memory unit or units. The memory 704 may also be another form of computer-readable medium, such as a magnetic or optical disk.

The storage device 706 is configured to provide mass storage for the computing device 700. In one implementation, the storage device 706 may be or may contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain (e.g., store) instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, computing device 700 may be implemented as a standard server 720, or multiple times in a group of such servers. Computing device 700 may also be implemented as part of a rack server system 724. In addition, computing device 700 may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output (I/O) device such as a display 754, a communication interface 766, and a transceiver 768, among other components. The device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert the spoken information to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, computing device 750 may be implemented as a cellular telephone 780. Computing device 750 may also be implemented as part of a smart phone 782, personal digital assistant, or other similar mobile device.

According to an example embodiment, the systems and methods described above provide a device (e.g., user device 105, servers 125, 130 and computing device 750) configured to trigger search request(s) may have, for example, the most up-to-date unified search metadata such that the device queries the unified search metadata locally stored. According to another example embodiment, the systems and methods described above provide a device (e.g., user device 105, servers 125, 130 and computing device 750) configured to trigger search request(s) (which can be protocol specific depending on the storage device to be searched) upon a determination that the device does not have all of the most up-to-date unified search metadata so the device generates the search request(s) to update the unified search metadata.

According to still another example embodiment, the systems and methods described above provide a user device (e.g., user device 105, servers 125, 130 and computing device 750) configured to initiate a unified search, such that one or more search requests are generated at a different device other than the user device. According to still another example embodiment, the systems and methods described above provide a device (e.g., user device 105, servers 125, 130 and computing device 750) configured to trigger a search request(s) (which can be protocol specific depending on the device) does an initial result view based on the locally stored unified search metadata and then updates the result view as results are received in response to the individual search requests.

According to still another example embodiment, the systems and methods described above unified search metadata is created based on metadata asynchronously pushed to the device creating and storing the unified search metadata. According to still another example embodiment, the systems and methods described above unified search metadata is created based on metadata pulled, in response to requests, to the device creating and storing the unified search metadata.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

What is claimed is:

1. A user device including a processor, the user device comprising:
   a memory including code segments that when executed by the processor cause the processor to:
   generate a search parameter;
   generate a first search metadata based on data stored on the user device and the search parameter, the first search metadata representing the data stored on the user device;
   generate a search request based on the search parameter, the search request and the search parameter initiated through a single action by a user of the user device;
   transmit the search request to at least one remote data storage resource associated with the user of the user device, the at least one remote data storage resource being configured as a file hosting service;
   receive a second search metadata from the at least one remote data storage resource, the second search metadata representing data stored in the at least one remote data storage resource, the data being associated with the user of the user device; and
   generate a unified search metadata including the first search metadata and the second search metadata.

2. The user device according to claim 1, wherein generating the search request includes:
   determining a protocol associated with the at least one remote data storage resource; and
   generating the search request for the at least one remote data storage resource using the associated protocol.

3. The user device according to claim 1, wherein the memory further includes code segments that when executed by the processor causes the processor to:
   generate a second search request, the second search request including a request for metadata changes, the metadata changes being based on data changes over a time period;
   transmit the second search request to the at least one remote data storage resource;
   receive search metadata changes based on the second search request; and
   update the unified search metadata based on the received search metadata changes.

4. The user device according to claim 1, wherein the memory further includes code segments that when executed by the processor causes the processor to:
   synchronize metadata between the user device and the at least one remote data storage resource; and
   update the unified search metadata using the synchronized metadata.

5. The user device according to claim 1, wherein the memory further includes code segments that when executed by the processor causes the processor to:
   synchronize metadata between the user device and the at least one remote data storage resource; and
   update the unified search metadata using the synchronized metadata, wherein the synchronized metadata only includes data associated with the second search metadata.

6. The user device according to claim 1, wherein the at least one remote data storage resource includes two remote data storage resources each having a different associated user credential for the user of the user device.

7. A server comprising:
   a processor configured to receive user device metadata and a search parameter from a user device, the user device metadata representing data that is associated with a user of the user device stored on the user device; and
   a memory including code segments that when executed by the processor cause the processor to:
   generate first search metadata based on the received user device metadata and the search parameter;
   generate second search metadata based on data stored in the memory that is associated with the user of the user device and the search parameters, the second metadata representing data stored in the memory that is associated with the user of the user device;
   generate a search request based on the search parameter, the search request and the search parameter initiated through a single action by the user of the user device;
   transmit the search request to a remote data storage resource that is associated with the user of the user device, the remote data storage resource being configured as a file hosting service associated with the user device;
   receive third search metadata, in response to the search request, from the remote data storage resource, the third search metadata representing data stored at the remote data storage resource that is associated with the user of the user device;
   generate unified search metadata including the first search metadata, the second search metadata, and the third search metadata; and
   transmit the unified search metadata to the user device.

8. The server of claim 7, wherein
   the processor further receives update metadata from the user device, the update metadata being based on the unified search metadata,
   generate delta unified search metadata based on the update metadata, and
   transmit the delta unified search metadata to the user device.

9. The server of claim 7, wherein
   the processor further receives update metadata from the remote data storage resource, the update metadata being based on the search request, generate delta unified search metadata based on the update metadata, and transmit the delta unified search metadata to the user device.

10. The server according to claim 7, wherein generating the search request includes, determining a protocol associated with the remote data storage resource, and generating the search request for the remote data storage resource using the associated protocol.

11. The server according to claim 7, wherein the memory further includes code segments that when executed by the processor causes the processor to:

synchronize metadata between the user device and the remote data storage resource:

update the unified search metadata using the synchronized metadata; and transmit the updated unified search metadata to the user device.

12. The server according to claim 7, wherein the at least one remote data storage resource includes two remote data storage resources each having a different associated user credential.

13. A method comprising:

generating a search parameter;

generating a first search metadata based on data stored on a user device and the search parameter, the first search metadata representing the data stored on the user device;

generating a search request based on the search parameter, the search request and the search parameter initiated through a single action by a user of the user device;

transmitting the search request to at least one remote data storage resource associated with the user of the user device, the at least one remote data storage resource being configured as a file hosting service;

receiving a second search metadata from the at least one remote data storage resource, the second search metadata representing data stored in the at least one remote data storage resource, the data being associated with the user of the user device; and generating a unified search metadata including the first search metadata and the second search metadata.

14. The method according to claim 13, wherein generating the search request includes:

determining a protocol associated with the at least one remote data storage resource; and generating the search request for the at least one remote data storage resource using the associated protocol.

15. The method according to claim 13, further comprising:

generating a second search request, the second search request including a request for metadata changes, the metadata changes being based on data changes over a time period;

transmitting the second search request to the at least one remote data storage resource;

receiving search metadata changes based on the second search request; and updating the unified search metadata based on the received search metadata changes.

16. The method according to claim 13, further comprising:

synchronizing metadata between the user device and the at least one remote data storage resource; and updating the unified search metadata using the synchronized metadata.

17. The method according to claim 13, further comprising:

synchronizing metadata between the user device and the at least one remote data storage resource; and updating the unified search metadata using the synchronized metadata, wherein the synchronized metadata only includes data associated with the second search metadata.

18. The method according to claim 13, wherein the at least one-remote data storage resource includes two remote data storage resources each having a different associated user credential for the user of the user device.

* * * * *